(12) United States Patent
Nykolak

(10) Patent No.: US 8,412,050 B2
(45) Date of Patent: Apr. 2, 2013

(54) COAXIAL FREE SPACE OPTICAL TELESCOPE AND SYSTEMS USING THE SAME

(75) Inventor: Gerald Nykolak, Long Island, NY (US)

(73) Assignee: Alcatel Lucent, Paris (FR)

( * ) Notice: Subject to any disclaimer, the term of this patent is extended or adjusted under 35 U.S.C. 154(b) by 997 days.

(21) Appl. No.: 12/289,258

(22) Filed: Oct. 23, 2008

(65) Prior Publication Data

US 2010/0104293 A1    Apr. 29, 2010

(51) Int. Cl.
*H04B 10/00* (2006.01)
*H04J 14/02* (2006.01)
*G02F 1/33* (2006.01)
*G02F 1/29* (2006.01)
*G02B 5/18* (2006.01)

(52) U.S. Cl. .............. 398/130; 398/79; 398/80; 398/81; 398/82; 398/83; 359/308; 359/318; 359/572; 359/568

(58) Field of Classification Search .................... 398/41, 398/42, 79–86; 359/207.8, 211.1, 359, 308, 359/318, 320, 515–553, 568, 572, 634, 638, 359/639, 838, 850, 831, 833, 834, 837
See application file for complete search history.

(56) References Cited

U.S. PATENT DOCUMENTS

| 4,312,592 A * | 1/1982 | Sabater et al. ............... 356/28 |
| 5,165,079 A * | 11/1992 | Schulz-Hennig ............ 359/634 |
| 5,187,759 A * | 2/1993 | DiGiovanni et al. .......... 385/27 |
| 5,521,733 A * | 5/1996 | Akiyama et al. ............... 398/48 |
| 6,252,719 B1 * | 6/2001 | Eichenbaum ................ 359/634 |
| 6,282,000 B1 * | 8/2001 | Kikuchi et al. ............... 398/136 |
| 6,839,517 B2 * | 1/2005 | Anigbo et al. ................ 398/85 |
| 6,939,058 B2 * | 9/2005 | Gurevich et al. .............. 385/93 |
| 7,190,864 B2 * | 3/2007 | Jiang et al. .................... 385/50 |
| 7,254,330 B2 * | 8/2007 | Pratt et al. ..................... 398/67 |
| 7,369,776 B2 * | 5/2008 | Masahiko ..................... 398/138 |
| 7,415,210 B2 * | 8/2008 | Gurevich et al. .............. 398/86 |
| 7,539,367 B2 * | 5/2009 | Tamura et al. ................ 385/14 |
| 2003/0223684 A1 * | 12/2003 | Kropp ........................... 385/24 |
| 2004/0008401 A1 * | 1/2004 | Szczepanek et al. ......... 359/290 |
| 2004/0202415 A1 * | 10/2004 | Ohmuro ........................ 385/24 |
| 2005/0025483 A1 * | 2/2005 | Gurevich et al. .............. 398/68 |
| 2007/0098029 A1 * | 5/2007 | LeBoeuf et al. ............... 372/39 |

* cited by examiner

*Primary Examiner* — Kenneth N Vanderpuye
*Assistant Examiner* — Abbas H Alagheband
(74) *Attorney, Agent, or Firm* — Harness, Dickey & Pierce

(57) ABSTRACT

Example embodiments may include a coaxial Free Space Optical (FSO) telescope providing a simplified and more precise structure. Example embodiment telescopes include a prism structure having at least two parallel surfaces associated with a filter and mirror. The filter may reflect or transmit optical signals based on their electromagnetic characteristics. Example embodiment systems include example embodiment coaxial FSO telescopes and transmitters and receivers for receiving and transmitting optical signals. A V-groove and/or lens array may be included in example embodiment FSO systems.

12 Claims, 5 Drawing Sheets

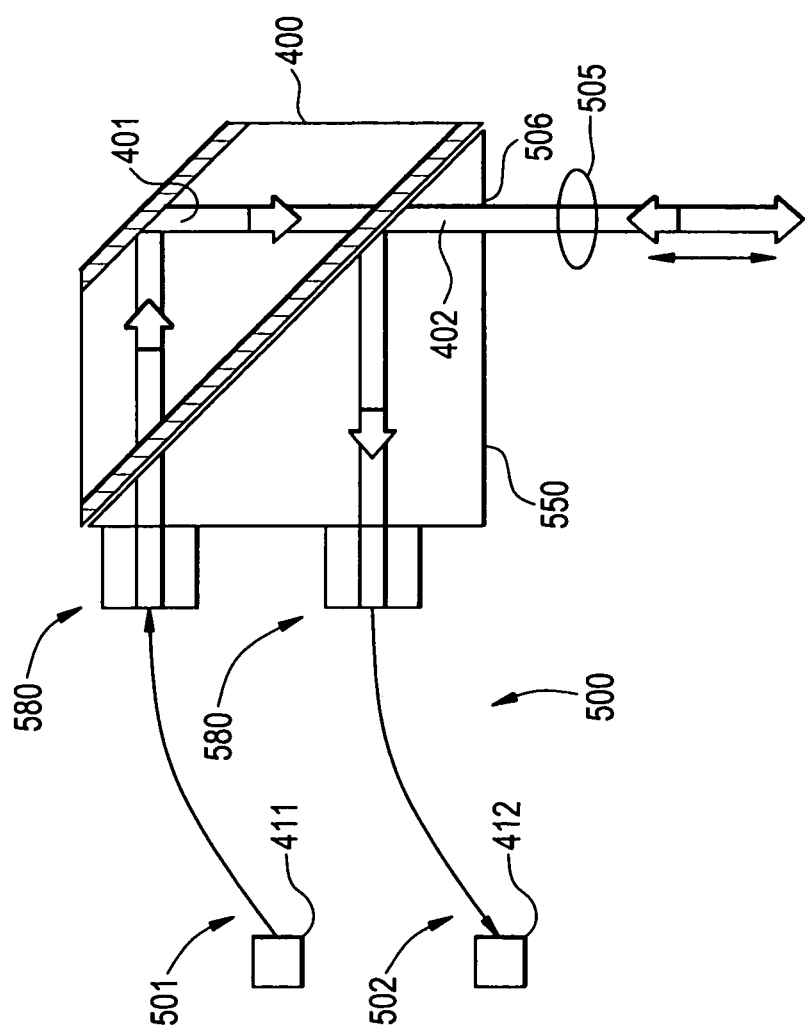

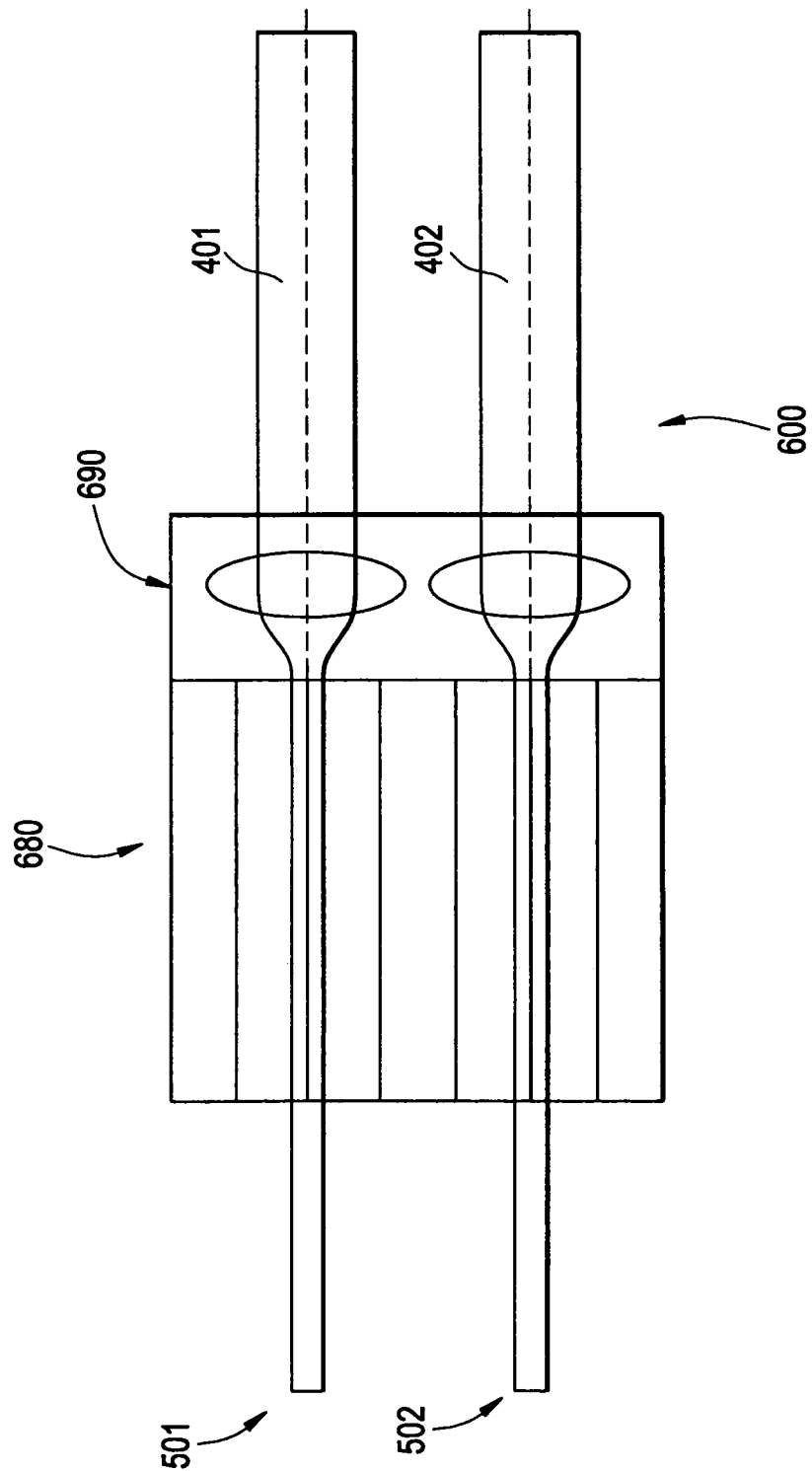

COAXIAL FREE SPACE OPTICAL TELESCOPE AND SYSTEMS USING THE SAME

BACKGROUND

Free space optical (FSO) transmission is a type of information exchange using electromagnetic waves, or optical signals, to carry information. FSO transmission may require no propagation medium, such as fiber-optic cable or electrical wire, for successful information transmission. For example, electromagnetic signals carrying information in their amplitude, frequency, polarization, phase, etc. may be sent and received through space, from one point to another.

FSO receiving and/or transmitting devices may be referred to as telescopes. FIG. 1 is an illustration of a pair of conventional coaxial FSO telescopes 100 and 200. As used herein, the term "coaxial" includes the use of a common aperture/path for both transmitted and received signals. As shown in FIG. 1, coaxial telescope 100 may use a shared path 105 for both sending and receiving optical signals 101 and 102. Telescope 100 may include one or more transmitters 111 and receivers 112 optically coupled to a filter 120. Transmitter 111 may be any type of known optical transmitter capable of generating and encoding information onto electromagnetic signals; similarly, receiver 112 may be any type of known optical receiver capable of perceiving electromagnetic signals and decoding information from them.

Transmitted optical signals 101 and received optical signals 102 may at times overlap in space through shared path 105, such that telescope 100 may receive and transmit electromagnetic signals through a single, small aperture or other sending/receiving portal. Signals 101 and 102 conventionally use different wavelengths of light so that a filter 120 or other optical combiner/separator component may discriminate among received and transmitted optical signals 102/101. For example, filter 120 may reflect a particular wavelength of light used for receiving signals 102 and transmit a different wavelength of light used for transmitting signals 101.

As shown in FIG. 1, a transmitted signal 101 of a first frequency may pass through filter 120, while a received signal 102 of a second frequency may be reflected to a receiver 112 by filter 120. Thus, in order to differentiate between coaxial transmitted/received signals 101/102, receiver 112 and transmitter 101 may not be co-located. Similarly, in order to maintain the coaxial nature (overlap) of send/receive signals 101/102 without signal angular divergence and/or transverse offset (borosight error), positions and angles of receiver 112, transmitter 111, and filter 120 may each correspond and be maintained in relatively precise relative alignment.

Another coaxial telescope 200 may be positioned on the opposite end of path 105 and be substantially similar to the above-described telescope 100. The receiver 212 and transmitter 211 may be in opposite positions, if filter 220 has the same optical properties of filter 120. Alternately, filter 220 may have different optical properties and receiver 212 and transmitter 211 may be reversed based on which signals filter 220 reflects and transmits. In this way, signals 101 and 102 may be transmitted between telescopes 100 and 200 through a shared transmit/receive path 105 through free space.

FIG. 2 is an illustration of another conventional FSO coaxial telescope 300. As shown in FIG. 2, telescope 300 may possess several similar features of telescopes 100 and 200, including a transmitter 311, receiver 312, and filter 320. Transmitted signal 301 and received signal 302 may similarly share a transit path 305. Conventional coaxial telescope 300 may further include a secondary mirror 321 that reflects signal 301 to filter 320, where it is subsequently reflected into shared path 305. Mirror 321 may permit both receiver 312 and transmitter 311 to be co-located, thereby permitting greater linear integration and size reduction of telescope 300. Positions and angles of receiver 312, transmitter 311, filter 320, and mirror 321 may each correspond such that the coaxial nature of send/receive signals 301/302 may be maintained without significant signal angular divergence and/or transverse offset (borosight error).

SUMMARY

Example embodiments may include a coaxial FSO telescope that provides a simplified and more precise structure for ensuring angular coherence and overlap among optical signals transmitted/received therefrom in a shared transit path. Example embodiment telescopes may include a prism structure having at least two parallel surfaces associated with a filter and mirror. The filter may reflect or transmit optical signals based on their electromagnetic characteristics, including, for example, frequency, magnitude, polarization, etc. Because of the higher degree of parallelism between the filter and mirror, optical signals reflected and transmitted therefrom may have a higher degree of overlap in the shared transit path.

Example embodiment systems may include example embodiment coaxial FSO telescopes and transmitters and receivers for receiving and transmitting optical signals. A self-aligning V-groove and/or lens array may improve the degree of parallelism between optical signals incident on the filter and mirror, thereby increasing a degree of overlap of these signals in the shared transit path.

BRIEF DESCRIPTION OF THE DRAWINGS

Example embodiments will be more clearly understood from the following detailed description taken in conjunction with the accompanying drawings. FIGS. 1-6 represent non-limiting, example embodiments as described herein.

FIG. 1 is an illustration of a conventional coaxial FSO telescope pair.

FIG. 2 is an illustration of another conventional coaxial FSO telescope.

FIG. 3 is an illustration of an example embodiment coaxial FSO telescope.

FIG. 4 is an illustration of an example embodiment FSO telescope system.

FIG. 5 is an illustration of an example embodiment lens system useable with example embodiment FSO telescope systems.

DETAILED DESCRIPTION

Figure 1:
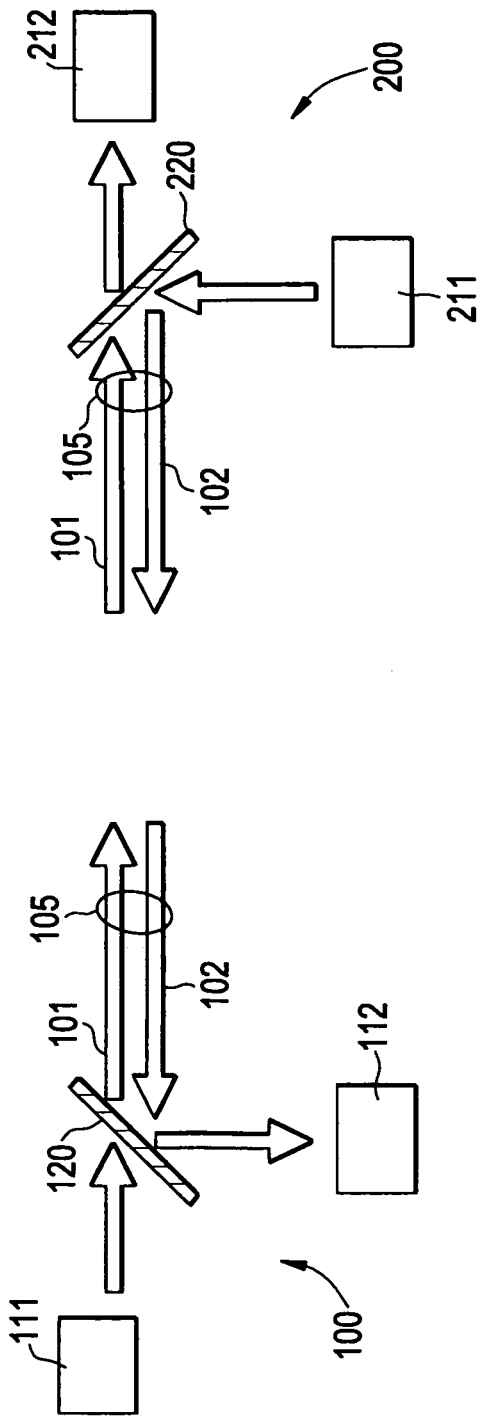

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 3:
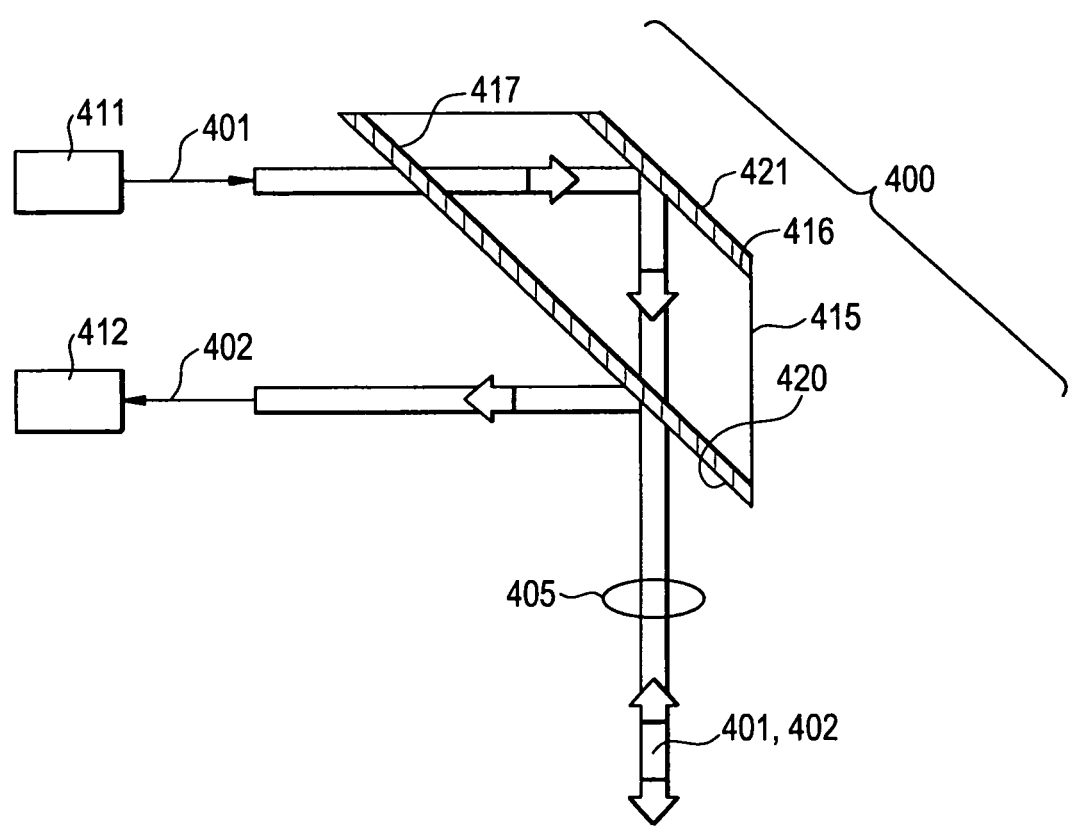

FIG. 3 is an illustration of an example embodiment coaxial free space optical (FSO) telescope 400. Transmitted signals 401 and received signals 402 may share a transit path 405 into and out of example embodiment FSO telescope 400. A transmitter 411 and/or receiver 412 may be co-located or otherwise positioned with telescope 400 to form an FSO telescope system 500 (discussed with reference to FIG. 4). Although only two distinct signals 401 and 402 are shown in example embodiments for clarity, it is understood that example embodiment telescopes and systems using the same are compatible with any number of sent/received optical signals.

Example embodiment telescope 400 includes a prism structure 415. Prism structure 415 is capable of transmitting, or is transparent to, at least one of sent and received electromagnetic signals, including signals 401 or 402, through at least a portion of its prism. Prism structure 415 may be fabricated from a variety of materials in several different shapes and/or sizes. For example, a desired configuration of prism structure 415 may be chosen based on the electromagnetic characteristics of signals 401 and 402, the space to be occupied by telescope 400, the degree of integration desired of telescope 400, etc. Prism structure 415 may be fabricated of a continuous, rigid solid, which may allow for lower complexity and costs associated with manufacturing and materials used in manufacturing and may have improved reliability and performance. Alternately, prism structure 415 may include several different materials or be hollow if, for example, weight is to be minimized.

Prism structure 415 includes at least two substantially parallel surfaces 416 and 417. Surfaces 416 and 417 may be on opposite sides of prism structure 415 and/or parallel in a cross-sectional reference frame containing prism structure 415. As shown in FIG. 3, an example embodiment FSO telescope 400 may include a trapezoidal prism structure 415 having parallel surfaces 416 and 417 on opposite sides of a trapezoidial cross-section of prism structure 415. Alternatively, prism structure 415 may be cubical, frusto-conical, etc., depending on the desired application of example embodiment FSO telescopes.

A prism structure 415 with parallel surfaces 416 and 417 may be fabricated by any of several known means of forming parallel surfaces. For example, if prism structure 415 is fabricated from a continuous, crystalline solid having a known crystal lattice structure, such a crystalline solid may be cut along known lattice positions at surfaces 416 and 417 to ensure that surfaces 416 and 417 are parallel by the nature of the crystalline lattice structure of prism structure 415. For example, prism structure 415 may be fabricated from a single-phase silicon or silicon-dioxide ($SiO_2$) crystal cut at surfaces 416 and 417 at parallel lattice positions. Alternatively, other planarization methods, such as conventional leveling mechanisms, may be used to form prism structure 415 having parallel surfaces 416 and 417 from a variety of materials.

A filter 420 is attached to or otherwise placed along one of the parallel surfaces 417 that is closer to transmitted signal 401 and/or received signal 402 in shared transit path 405. That is, transmitted signal 401 from an external transmitter will encounter filter 420 before entering and/or exiting prism structure 415, and received signal 402 will encounter filter 420 before reaching an external receiver 412. Filter 420 either transmits and/or reflects electromagnetic signals, including signals 401/402, based on the frequency, polarization, and/or another electromagnetic property of the signal. For example, filter 420 may be a Dielectric Thin Film Filter (TFF) including alternating layers of higher-index and lower-index dielectric material deposited on a substrate. Dielectric materials, number of layers, layer thickness, etc. included in a Dielectric TFF may be chosen based on the desired optical transmission and reflection properties of the filter. Alternately, filter 420 may be any known filter type based on the desired filter properties, such as a filter as discussed above with regard to FIG. 1.

Filter 420 substantially transmits the transmitted signal 401. That is, transmitted signal 401 substantially passes through filter 420 and into/out of prism structure 415 without reflection, refraction, and/or any other substantial property change. Filter 420 on parallel surface 417 may cause substantially less incidental reflection, and signal loss, than a bare surface 417 having an air/prism structure interface, particularly at greater angles of incidence. Alternatively, filter 420 may be absent from a part of the transmit path of transmitted signal 401 between transmitter 411 and prism structure 415, so as to not affect signal 401, regardless of the optical properties of filter 420 and signal 401.

Filter 420 substantially reflects the received signal 402. Filter 420 may substantially affect only direction of the received signal and not any other property. Prism structure 415 and filter 420 may be positioned and/or angled so as to substantially align shared transit path 405 and a receiving part of receiver 412 with filter 420, such that a received signal 402 incident upon filter 417 is reflected with precision to receiver 412.

A mirror 421 is attached or otherwise placed along parallel surface 416 further from shared transit path 405. Mirror 421 substantially reflects the transmitted signal 401. Because filter 420 may reflect received signal 402 and not substantially affect transmitted signal 401, only transmitted signal 401 may reach mirror 421 through prism structure 415. Prism structure 415 and mirror 421 may be positioned and/or angled so as to substantially align shared transit path 405 and a transmitting part of transmitter 411 with mirror 421, such that a transmitted signal 421 incident upon mirror 421 is reflected with precision into shared transit path 405.

Although example embodiment FSO telescope 400 is shown in FIG. 3 with a transmitted signal 401 above a received signal 402 and only transmitted signal 401 incident upon mirror 421, it is understood that signals 401 and 402 may originate from other locations and/or transmitter 411 and receiver 412 may be remote and/or separated. Or, as an alternate example, optical properties of filter 420 may reflect only a transmitted signal 401 and substantially transmit a received signal 402, such that the positioning of signals 401/402 may be reversed in FIG. 3. Similarly, several more optical signals may be used in example embodiment telescopes, and filters and transmitters/receivers may be chosen so as to properly direct each signal between a shared transit path 405 and an appropriate transmitter/receiver.

Increased overlap and decreased divergence (reduced co-boresight error) between signals 401 and 402 may be achieved by increased parallelism and precision in separation between mirror 421 and filter 420. Because example embodiment telescope 400 may include a single prism structure 415 with a simplified structure, surfaces 416 and 417 may be more easily made parallel with an exact separation. For example, if prism structure 415 is fabricated from a crystalline material, surfaces 416 and 417 may necessarily be in parallel due to the crystal lattice geometry favoring only parallel cuts in those planes. Further, for example, if prism structure 415 is fabricated as a simple cube or trapezoidal prism, separation between surfaces 416 and 417 may be precisely set and achieved when forming surfaces 416 and 417.

Because example embodiment telescope 400 may include a single prism structure 415 with a simplified structure, surfaces 416 and 417 may be more easily maintained in parallel with an exact separation, despite changing external conditions. For example, vibration or force acting on prism structure 415 will not affect the parallelism or separation between surfaces 416 and 417 due to the monolithic, rigid nature of prism structure 415.

Figure 2:
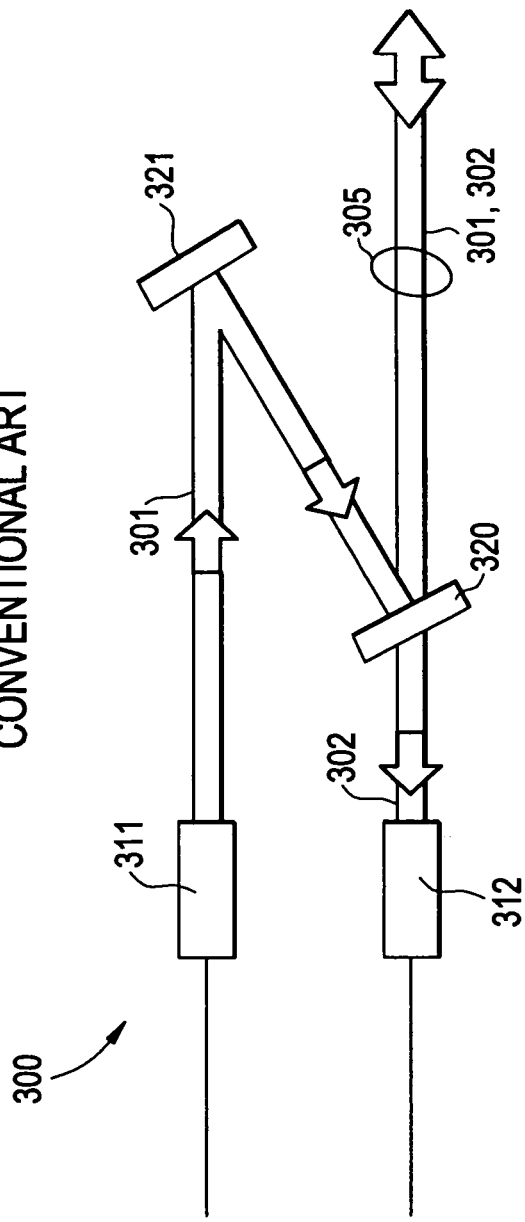

Less divergence among signals 401 and 402 may decrease a required size for transit path 405, reducing the area required for signal reception and transmission and permitting more telescopes in a particular area. Furthermore, the ability to co-locate receiver 412 and transmitter 411 in example embodiment telescope 400, without an additional external mirror as in conventional telescopes described above in FIG. 2, may permit greater integration and simplified information input/output of example embodiment telescopes.

FIG. 4 is an illustration of an example embodiment FSO system 500 including an example embodiment coaxial FSO telescope 400. Example embodiment FSO system 500 may include several features described in FIG. 4 having like numbering, whose redundant description is omitted below.

FSO system 500 includes at least one transmitter 411 and receiver 412 capable of generating and decoding electromagnetic signals, including signals 401 and 402, encoded with information, as is known in the art. Although transmitter 411 and receiver 412 are shown as co-located, it is understood that they may be remote from each other and/or from telescope 400. FSO system 500 may include a body 550 housing example embodiment coaxial FSO telescope 400. Although body 550 is shown as generally square, it is understood that any shape and configuration of body 550 may be useable with example system 500, depending on the desired application.

Body 550 may include an aperture 506 that permits transmitted and received electromagnetic signals 411 and 412 to freely enter and leave body 550 to/from shared transit path 505. Alternately, it is not critical that aperture 506 correspond to any specific structure. For example, aperture 506 may be symbolic of any arrangement by which signals 411 and 412 interact with body 550, or signals 411 and 412 may pass through body 550 unaffected.

Example embodiment FSO system 500 includes at least one lens 580 coupling a received or transmitted signal 401/402 to a transmission medium 501 or reception medium 502. Transmission medium 501 and reception medium 502 may include fiber optic cable, single mode or multimode, for example. Lenses 580 may adapt or otherwise translate signals 401 and 402 into a form that is conducted in transmission media 501 and 502. For example, lenses 580 may be a graded index (GRIN) lens that transforms electromagnetic signals 401 and 402 into other optical signals carried by media 501 and 502 and provides a flat surface for interfacing with example embodiment coaxial FSO body 550.

Lenses 580 may be coupled to body 550 or otherwise positionable with respect to example embodiment coaxial FSO telescope 400. Because example embodiment coaxial FSO telescopes 400 may preserve a greater degree of angular coherence between signals 401 and 402 entering/leaving shared transit path 505 as discussed above, the controlling factor of ultimate angular coherence and signal overlap in shared transit path 505 over long distances may be the degree of parallelism of signals 401 and 402 entering and leaving example embodiment FSO systems 500 through lenses 580. Thus, lenses 580 being readily aligned at a same angle and maintained as such with respect to telescope 400 may permit greater angular coherence among signals 401 and 402 and allow for smaller transit paths 505 between example embodiment FSO systems 500. For example, lenses 580 being GRIN lenses with flat ends and signal propagation perpendicular thereto may permit such alignment in FSO systems 500. Further, because lenses 580 may be positioned relatively close to telescope 400, an amount of space required to align signals 401 and 402 from unaligned media 501 and 502 may be small.

FIG. 5 illustrates an alternative example lens system 600 useable with example embodiment systems 500. Instead of individual lenses 580 (FIG. 4), a single example embodiment lens system 600 may be used to align signals 401 and 402 transmitted and received from example embodiment coaxial FSO telescopes. As shown in FIG. 5, a V-groove array 680 may be coupled with a Lens Array 690. One or more optical fibers 501 and 502 may be held in the V-groove array 608 in alignment with signals 401 and/or 402. Lens system 600 may be manufactures using known photolithographic and/or micro-machining techniques, for example, that may achieve precise alignment of fibers 501 and 502 with signals 401 and 402, thereby increasing coherence of signals 401/402 transmitted/received from example embodiment coaxial FSO telescopes even at micro-scales.

Lens array 690 may convert or adapt signals in optical fibers 501 and 502 into/from optical signals 401 and 402 for transmission in media 501 and 502. Lens array 690 and V-groove array 680 may be joined or otherwise aligned in order to preserve parallelism between signals 401 and 402. As discussed, alignment of signals 401 and 402 at a same angle with respect to telescope 400, as enabled by lens system 600, may permit greater angular coherence among signals 401 and 402 and allow for smaller transit paths 505 between example embodiment FSO systems 500.

Example embodiments of the present invention being thus described, it will be obvious that the same may be varied in many ways. For example, although a single pair of transmitted and received signals in a shared transit path has been discussed with respect to example embodiments, it is understood that several more transmitted and received signals may be used with example embodiment coaxial FSO telescopes. Such variations are not to be regarded as a departure from the spirit and scope of the exemplary embodiments of the invention, and all such modifications as would be obvious to one skilled in the art are intended to be included within the scope of the invention.

What is claimed is:

1. A coaxial free space optical (FSO) telescope comprising:
a prism structure having at least first and second substantially parallel surfaces;
a filter at the first parallel surface closer to a shared transit path of a plurality of optical signals transmitted or received by the FSO telescope, the filter configured to substantially pass a first optical signal of the plurality of optical signals to the second parallel surface and substantially reflect a second optical signal of the plurality of optical signals; and
a mirror at the second parallel surface farther from the shared transit path, the mirror configured to reflect the first optical signal such that the first parallel surface transmits both the first and second optical signals on the shared transit path.

2. The FSO telescope of claim 1, wherein the filter is absent from a portion of the one of the parallel surfaces, the portion being passed through by only the first optical signal.

3. The FSO telescope of claim 1, wherein the filter is configured to transmit and reflect based on at least one electromagnetic characteristic of the plurality of optical signals.

4. The FSO telescope of claim 1, wherein the prism structure is fabricated from a crystalline solid transparent to the plurality of optical signals.

5. The FSO telescope of claim 4, wherein the crystalline solid has a lattice structure that inherently favors the formation of at least two substantially parallel surfaces.

6. The FSO telescope of claim 4, wherein the crystalline solid is silicon-dioxide.

7. An FSO telescope system, comprising:
an FSO telescope including,
a prism structure having at least first and second substantially parallel surfaces,
a filter at the first parallel surface closer to a shared transit path of a plurality of optical signals transmitted or received by the FSO telescope, the filter configured to substantially pass a first optical signal of the plurality of optical signals to the second parallel surface and substantially reflect a second optical signal of the plurality of optical signals, and
a mirror at the second parallel surface farther from the shared transit path, the mirror configured to reflect the first optical signal such that the first parallel surface transmits both the first and second optical signals on the shared transit path;
at least one transmitter configured to transmit at least one of the plurality of optical signals; and
at least one receiver configured to receive at least one of the plurality of optical signals.

8. The FSO system of claim 7, further comprising:
at least one lens configured to make the plurality of optical signals substantially parallel and configured to adapt at least one of the optical signals for transmission to or from the receiver or the transmitter.

9. The FSO system of claim 8, wherein the at least one lens is a graded index lens.

10. The FSO system of claim 7, further comprising:
a plurality of media connections configured to transmit information in the plurality of optical signals to the receiver and from the transmitter;
a V-groove array coupled to the plurality of media connections, the V-groove array configured to make the plurality of optical signals substantially parallel with respect to the FSO telescope.

11. The FSO system of claim 10, wherein at least one lens is included in a lens array coupled to the V-groove array, the at least one lens configured to adapt at least one of the optical signals for transmission to or from the receiver or the transmitter.

12. The FSO system of claim 11, further comprising:
a body rigidly connecting and aligning the FSO telescope, the V-groove array, and the lens array.

* * * * *